United States Patent
Zhang et al.

(10) Patent No.: US 11,432,058 B2
(45) Date of Patent: Aug. 30, 2022

(54) HOUSING ASSEMBLY AND ELECTRONIC DEVICE

(71) Applicant: GUANGDONG OPPO MOBILE TELECOMMUNICATIONS CORP., LTD., Guangdong (CN)

(72) Inventors: Heng Zhang, Guangdong (CN); Shenbo Yan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/149,697

(22) Filed: Jan. 14, 2021

(65) Prior Publication Data

US 2021/0144458 A1    May 13, 2021

Related U.S. Application Data

(63) Continuation of application No. PCT/CN2018/095837, filed on Jul. 16, 2018.

(51) Int. Cl.
*H04R 1/02* (2006.01)
*H04M 1/03* (2006.01)

(52) U.S. Cl.
CPC .............. *H04R 1/02* (2013.01); *H04M 1/035* (2013.01); *H04R 2400/11* (2013.01); *H04R 2499/11* (2013.01)

(58) Field of Classification Search
CPC .. H04R 1/02; H04R 2400/11; H04R 2499/11; H04M 1/035; H04M 1/0202
See application file for complete search history.

(56) References Cited

U.S. PATENT DOCUMENTS 9,525,933 B2 * 12/2016 Chen .................... H04R 1/2842
10,356,498 B2 * 7/2019 Yoon ...................... H04R 1/345
(Continued)

FOREIGN PATENT DOCUMENTS

| CN | 201878214 | 6/2011 |
|---|---|---|
| CN | 105635365 | 6/2016 |

(Continued)

OTHER PUBLICATIONS

EPO, Office Action for EP Application No. 18927126.5, dated Jun. 22, 2021.
(Continued)

*Primary Examiner* — Oyesola C Ojo
(74) *Attorney, Agent, or Firm* — Hodgson Russ LLP (57) ABSTRACT

A housing assembly and an electronic device are provided. The housing assembly comprises a middle frame. The middle frame comprises a side surface. A first sound cavity, a second sound cavity and a sound output hole are arranged at the middle frame. One end of the first sound cavity corresponds to a receiver. The other end of the first sound cavity extends toward the side surface and communicates with the second sound cavity. The second sound cavity extends in a lengthwise direction of the side surface and is in communication with the sound output hole. The invention employs a sound guiding channel having an offset configuration to communicate a receiver with an external environment, thereby ensuring quality of an audio output while reducing an occupied region near the sound output hole and improving the appearance of a product to meet the appearance requirement.

20 Claims, 9 Drawing Sheets

(56) References Cited

U.S. PATENT DOCUMENTS

| | | | |
|---|---|---|---|
| 10,375,469 B2* | 8/2019 | Qin | H04R 1/025 |
| 2012/0106766 A1* | 5/2012 | Kuroda | H04M 1/035 |
| | | | 381/337 |
| 2013/0094685 A1* | 4/2013 | Seo | H04R 1/021 |
| | | | 381/332 |
| 2013/0223655 A1* | 8/2013 | Lee | H04R 1/34 |
| | | | 381/189 |
| 2014/0133684 A1* | 5/2014 | Zha | H04R 1/021 |
| | | | 381/345 |
| 2016/0127822 A1* | 5/2016 | Zhang | H04R 1/288 |
| | | | 381/346 |
| 2017/0134848 A1* | 5/2017 | Shao | H04R 7/18 |
| 2017/0180836 A1 | 6/2017 | Goller et al. | |
| 2019/0058933 A1* | 2/2019 | Huo | H04R 1/026 |

FOREIGN PATENT DOCUMENTS

| | | |
|---|---|---|
| CN | 2016145906 | 9/2016 |
| CN | 107124490 | 9/2017 |
| CN | 107613441 | 1/2018 |
| CN | 107734092 | 2/2018 |
| CN | 206993176 | 2/2018 |
| CN | 107770648 | 3/2018 |
| CN | 107908224 | 4/2018 |
| CN | 207460496 | 6/2018 |
| EP | 1868357 | 12/2007 |
| JP | H1198588 | 4/1999 |

OTHER PUBLICATIONS

WIPO, ISR for PCT/CN2018/095837, dated Apr. 17, 2019.

CNIPA, First Office Action for CN Application No. 201880094515.9, dated Jan. 21, 2022.

CNIPA, Second Office Action for CN Application No. 201880094515.9, dated Jun. 22, 2022.

* cited by examiner

HOUSING ASSEMBLY AND ELECTRONIC DEVICE

CROSS REFERENCE

This application is a continuation of International Application No. PCT/CN2018/095837, filed Jul. 16, 2018, the entire disclosure of which is incorporated herein by reference.

TECHNICAL FIELD

The present disclosure relates to the field of electronic device technologies, and more particularly, to a housing assembly and an electronic device.

BACKGROUND

For existing electronic devices such as mobile phones, tablet computers, and so on, a receiver is usually installed inside the electronic devices. A sound outlet is opened on a surface of a housing, and the sound outlet communicates the receiver with an external environment, such that a user can hear sound played by the receiver. As a screen-to-body ratio of the electronic devices such as mobile phones becomes higher and higher, an internal structure is more and more compact, it is particularly important to meet appearance requirements of products without influencing sound qualities.

SUMMARY

The present disclosure provides a housing assembly and an electronic device to solve problems as mentioned above.

In a first aspect, a housing assembly is provided. The housing assembly includes a middle frame. The middle frame includes a side surface. A first sound cavity, a second sound cavity and a sound outlet are respectively defined in the middle frame. One end of the first sound cavity corresponds to a receiver, and the other end of the first sound cavity extends toward the side surface and is in communication with the second sound cavity. The second sound cavity extends along a lengthwise direction of the side surface and is in communication with the sound outlet.

In a second aspect, a housing assembly is provided. The housing assembly includes a middle frame. An acoustic channel is defined in the middle frame. One end of the acoustic channel faces a receiver, and the other end of the acoustic channel communicates with an external environment. The middle frame includes a supporting part disposed at the other end of the acoustic channel. The housing assembly includes a decorative member. The decorative member is disposed on the supporting part and covers the other end of the acoustic channel. The housing assembly further includes a row of sound outlets. The row of sound outlets is defined in the decorative member.

In a third aspect, an electronic device is provided. The electronic device includes a housing assembly. The housing assembly includes a middle frame. The middle frame includes a side surface. A first sound cavity, a second sound cavity and a sound outlet are defined in the middle frame. One end of the first sound cavity correspond to a receiver, and the other end of the first sound cavity extends toward the side surface and is in communication with the second sound cavity. The second sound cavity extends along a lengthwise direction of the side surface and is communication with the sound outlet. The electronic device further includes a receiver. The receiver is arranged in the housing assembly and corresponds to one end of the first sound cavity.

A housing assembly and an electronic device provided by the embodiments of the present disclosure form an acoustic channel with an offset configuration by communicating a first sound cavity extending toward a side surface of a middle frame, a second sound cavity extending toward a lengthwise direction of the side surface with a sound outlet, so that under a premise of ensuring sound quality of an audio, space occupation close to the sound outlet is saved, and product appearance is enhanced to meet appearance requirements.

Aspects as mentioned above, or other aspects provided by the embodiments of the disclosure are more concise and understandable in the description of the following embodiments.

BRIEF DESCRIPTION OF THE DRAWINGS

In order to more clearly illustrate the technical solutions in the embodiments of the present application, the drawings used in the description of the embodiments will be briefly described below. It is obvious that the drawings in the following description are just some embodiments of the disclosure. Other drawings may also be obtained from those of ordinary skilled in the art in light of the inventive work.

DETAILED DESCRIPTION OF PREFERRED EMBODIMENTS

The embodiments of the disclosure are described in detail below. Examples of the embodiments are shown in the drawings. In the embodiments, same or similar reference numerals represent same or similar elements or elements with same or similar functions. The following embodiments described with referencing to the drawings are exemplary, and are only used to explain the disclosure, and cannot be understood as a limitation to the disclosure.

In descriptions of the disclosure, it should be understood that orientations or positional relationships indicated by terms "center", "vertical", "horizontal", "length", "width", "thickness", "upper", "lower", "front", "rear", "left", "right", "vertical", "horizontal", "top", "bottom", "inner", "outer", "clockwise", "counterclockwise" are based on orientations or positional relationships shown in the drawings. The orientations or the positional relationships are only used to describe the disclosure and simplify the descriptions, not to indicate or imply that devices or elements must have specific orientations, and that the orientations or the positional relationships are constructed and operated in specific orientations. Therefore, the orientations or the positional relationships cannot be understood as a limitation of the disclosure.

In addition, terms "first" and "second" are only used to describe purposes and cannot be understood as indicating or implying relative importance or implicitly indicating number of indicated technical features. Therefore, the features defined with "first" and "second" may explicitly or implicitly include one or more of the features. In the descriptions of the disclosure, "plurality" means two or more than two, unless otherwise specifically defined. In the descriptions of the disclosure, it should be noted that, unless otherwise clearly specified and limited, terms "installation", "communication" and "connection" should be understood in a broad sense. For example, "connection" can be a fixed connection, a detachable connection, or an integral connection, and "connection" can be a mechanical connection, an electrical connection or can communicate with each other, and "connection" can be directly connected, or indirectly connected via an intermediate medium, and "connection" can be a connection between two elements or an interaction between two elements. For those of ordinary skilled in the art, the specific meanings of the above-mentioned terms in this application can be understood according to specific circumstances. For those of ordinary skilled in the art, the specific meanings of the terms as mentioned above in the disclosure can be understood according to specific circumstances.

In the disclosure, unless otherwise specified and defined, the "above" or "below" of a first feature of a second feature may include that the first feature directly contacts the second feature or may include that the first feature contacts the second features via other features. Moreover, the first feature is above the second feature, includes that the first feature is directly above and obliquely above the second feature, or only indicates that a level of the first feature is higher than a level of the second feature. The first feature is below the second feature, includes that the first feature directly below and obliquely below the second feature, or only indicates that the level of the first feature is lower than the level of the second feature.

At present, in electronic devices such as mobile phones, tablet computers, and so on, a receiver is usually installed inside the electronic devices. A sound outlet is opened on a surface of a housing, and the sound outlet communicates the receiver with an external environment such that a user can hear sound played by the receiver. As an increasing screen-to-body ratio of the electronic devices, in order to keep a beautiful appearance of the electronic devices, important structures such as cameras and sensors are compacted together, so an internal space left for an installation of the receiver is compressed. It is particularly important to meet product appearance requirements without influencing sound qualities.

In order to enable those skilled in the art to better understand the solutions of the disclosure, the technical solutions in the embodiments of the disclosure are described clearly and completely accompanying with drawings of embodiments of the disclosure as follows. Apparently, the described embodiments are only a part of the embodiments of the disclosure, but not all the embodiments. Based on the embodiments of the disclosure, all other embodiments achieved by those ordinarily skilled in the art without doing any creative work, should be comprised in the scope of the disclosure.

First Embodiment

Figure 1:
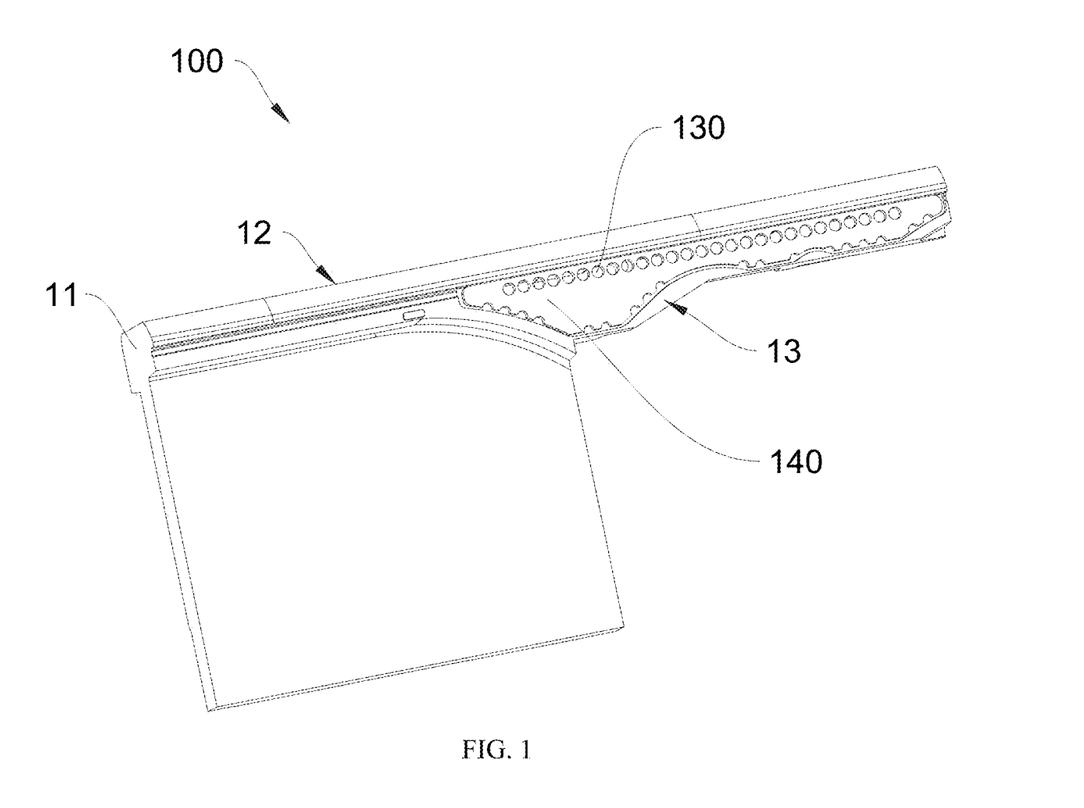
FIG. 1 illustrates a schematic structural diagram of a housing assembly according to a first embodiment of the disclosure.
Figure 2:
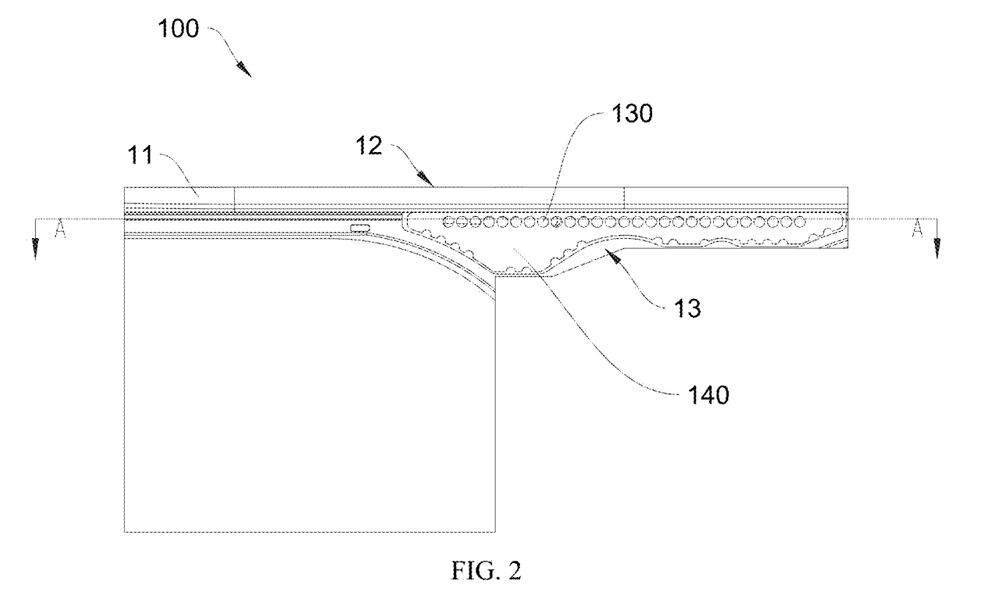
FIG. 2 illustrates a schematic structural diagram of the housing assembly in a second perspective according to the first embodiment of the disclosure.

Please refer to FIG. 1. FIG. 1 illustrates a schematic structural diagram of a housing assembly 100 according to a first embodiment of the disclosure. In some embodiments, the housing assembly 100 may be a housing or a part of a housing of an electronic device 10 such as a mobile phone.

The housing assembly 100 includes a middle frame 11. The middle frame 11 includes a side surface 12 and an outer surface 13 connected to the side surface 12. As a means, when the housing assembly 100 is a part of a mobile phone, the side surface 12 of the middle frame 11 may be a plane (or a curve surface) where an outer frame of the mobile phone is located, e.g., a top surface on an upper end of the mobile phone (or the side surface 12 on a left end or a right end of the mobile phone, a bottom surface 17 on a lower end of the mobile phone). The outer surface 13 of the middle frame 11 may be a plane (or a curve surface) on a side where a display screen of the mobile phone is installed, e.g., a front plane of the mobile phone facing a user (or a back plane of the mobile phone away from the user).

Figure 7:
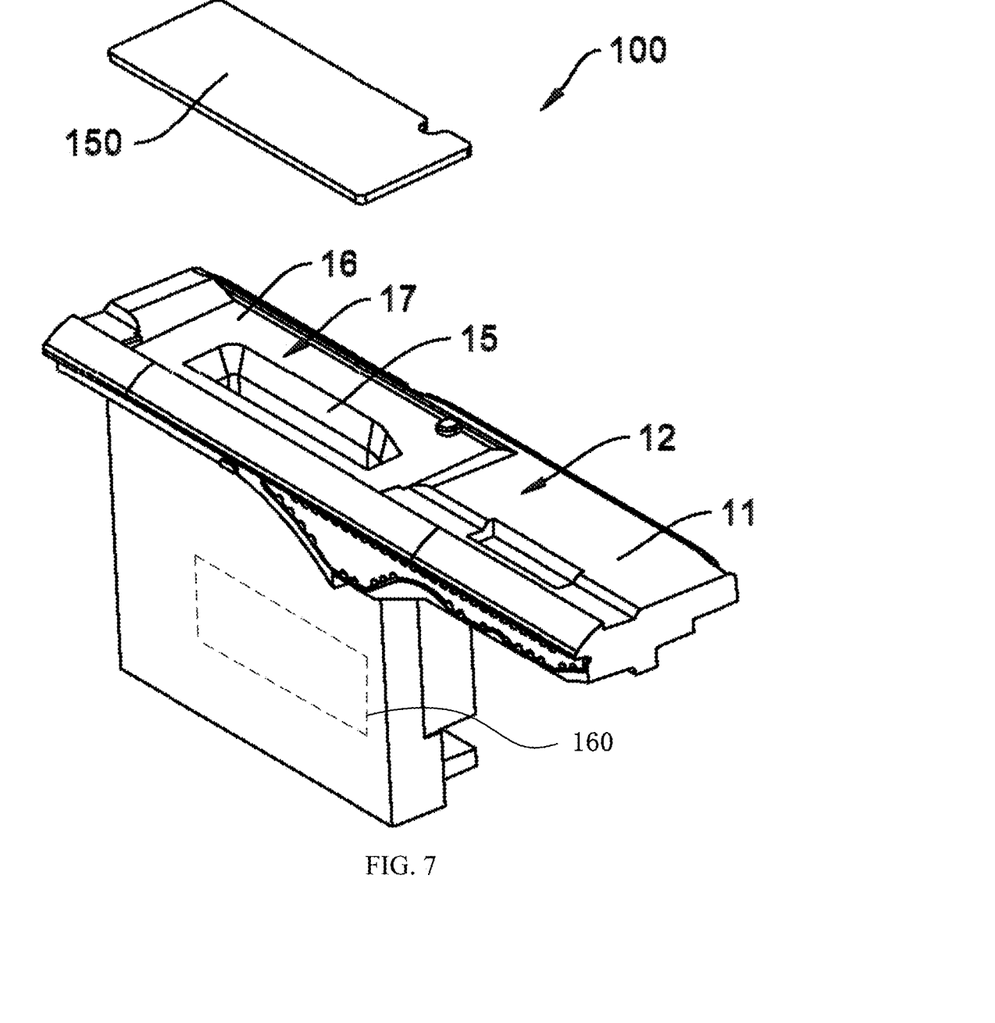
FIG. 7 illustrates an exploded schematic diagram of the housing assembly in a fourth perspective according to the first embodiment of the disclosure.

Please refer to FIG. 2, FIG. 3, FIG. 4, and FIG. 5. The middle frame 11 includes an acoustic channel, and the acoustic channel extends from one side of the middle frame 11 to a center of the middle frame 11. One end of the acoustic channel faces a receiver 160 (as shown in FIG. 7), and the other end of the acoustic channel communicates with an external environment. The acoustic channel includes a number of inclined surfaces which are disposed inside the acoustic channel to redirect sound waves. Furthermore, a supporting part 1222 is disposed at the other end of the acoustic channel. In some embodiments, the acoustic channel includes a first sound cavity 110, a second sound cavity 120, and a row of sound outlets 130 is defined in the acoustic channel. The first sound cavity 110, the second sound cavity 120 and the sound outlet 130 are defined in a middle frame 11. One end of the first sound cavity 110 corresponds to a receiver 160 (as shown in FIG. 7). The other end of the first sound cavity 110 extends toward the side surface 12 and communicates with the second sound cavity 120. The second sound cavity 120 extends along a lengthwise direction of the side surface 12 and communicates with the sound outlet 130. In some embodiments, the receiver 160 may be installed close to the first sound cavity 110 (e.g., one end of the first sound cavity 110 away from the side surface 12). Sound waves projected by the receiver 160 can enter the first sound cavity 110.

As a means, after the sound waves projected by the receiver 160 enter the first sound cavity 110, and the sound waves transmit along an extending direction of the first sound cavity 110 toward the side surface 12, then enter the second sound cavity 120, and transmit along an extending direction of the second sound cavity 120, that is, the lengthwise direction of the side surface 12. Finally, the sound waves transmit to an external environment of the housing assembly 100 through the sound outlet 130.

In this embodiment, a space shape of the sound cavity 110 may be a regular shape, such as a cuboid, a cylinder, a triangular prism or a quadrangular prism, or a combination of regular shapes, or may be an irregular shape. The extending direction of the first sound cavity 110 is oriented toward the side surface 12. A space shape of the second sound cavity 120 may be a regular shape, such as a cuboid, a cylinder, a triangular prism or a quadrangular prism, or a combination of regular shapes, or may be an irregular shape. The extending direction of the second sound cavity 120 is oriented toward the lengthwise direction of the side surface 12.

In this embodiment, an extending direction of the sound cavity can be understood as a primary acoustic propagation direction, or as a direction of a center axis of the sound cavity. When the side surface 12 is a rectangle, the lengthwise direction of the side surface 12 may be a direction of a longer side of the rectangle (when the longer side of the rectangle is a straight line, the lengthwise direction may be a rectilinear direction; when the longer side of the rectangle is a curve line, the lengthwise direction may be a curve direction). When the side surface 12 is one of other shapes, the lengthwise direction of the side surface 12 may be a direction of a longest diameter line connecting the two ends of the side surface 12, e.g., a long axis direction of an ellipse. It can be understood that when the housing assembly 100 is taken as a part of a housing of a mobile phone, the extending direction of the second sound cavity 120 may be a leftward from a right side or rightward from a left side of the mobile phone (that is, the second sound cavity extends from left to right or extends from right to left).

Figure 5:
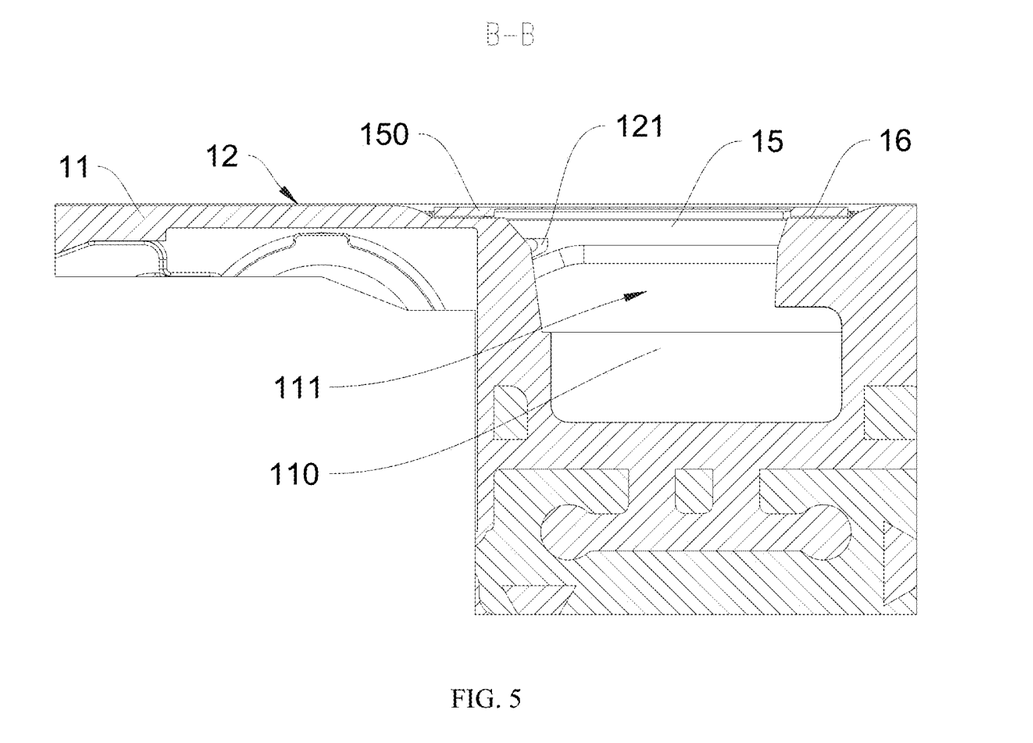
FIG. 5 illustrates a schematic cross-sectional diagram of a B-B direction in FIG. 4.

Please refer to FIG. 5. The middle frame 11 includes a sound guiding inclined surface 111, and the sound guiding inclined surface 111 is located in the first sound cavity 110 to redirect sound waves into the second sound cavity 120. In the present embodiment, the sound guiding inclined surface 111 connects two ends of the first sound cavity 110. An extending direction of the sound guiding inclined surface 111 is oriented toward the side surface 12 and the outer surface 13. The sound guiding inclined surface 111 can lead sound waves at one end of the first sound cavity 110 away from the side surface 12 and the outer surface 13 to the other end of the first sound cavity 110 close to the side surface 12 and the outer surface 13, making the sound waves enter the second sound cavity 120 through the other end of the first sound cavity 110 close to the side surface 12 and the outer surface 13. In some other embodiments, the sound guiding inclined surface 111 may extend along other directions, such as extending toward the side surface 12 but away from the outer surface 13.

As a preferred embodiment, a symmetric center line of the sound outlet 130 coincides with a symmetric center line of the middle frame 11. It can be understood that when the housing assembly 100 is taken as a part of the housing of the mobile phone, the sound outlet 130 may be disposed in a top middle of the housing of the mobile phone, or may be disposed in a bottom middle of the housing of the mobile phone, or may be disposed in left middle or right middle of the housing of the mobile phone.

When the symmetric center line of the sound outlet 130 coincides with the symmetric center line of the middle frame 11, the first sound cavity 110 relative to the symmetric center line of the middle frame 11 deviates toward a side of the middle frame 11 away from the symmetric center line of the middle frame 11. For example, when the sound outlet 130 is disposed in the top middle of the housing of the mobile phone, the first sound cavity 110 may be disposed in the left middle or the right middle of the housing deviating away from a symmetric center line of the housing of the mobile phone. The sound waves projected by the receiver 160 transmit upward through the first sound cavity 110 between both sides of the housing, then enter the second sound cavity 120 that is extending along leftward or rightward, and transmit to the sound outlet 130 in the top middle of the mobile phone to enter the external environment.

In this embodiment, the sound outlet 130 passes through the outer surface 13 of the middle frame 11. It can be understood that in other embodiments, the sound outlet 130 may be disposed in the side surface 12 of the middle frame 11, that is, the sound outlet 130 passes through the side surface 12 of the middle frame 11. The sound outlet 130 may be disposed in the outer surface 13 of the middle frame 11 or other structures protruding from the side surface 12.

Figure 3:
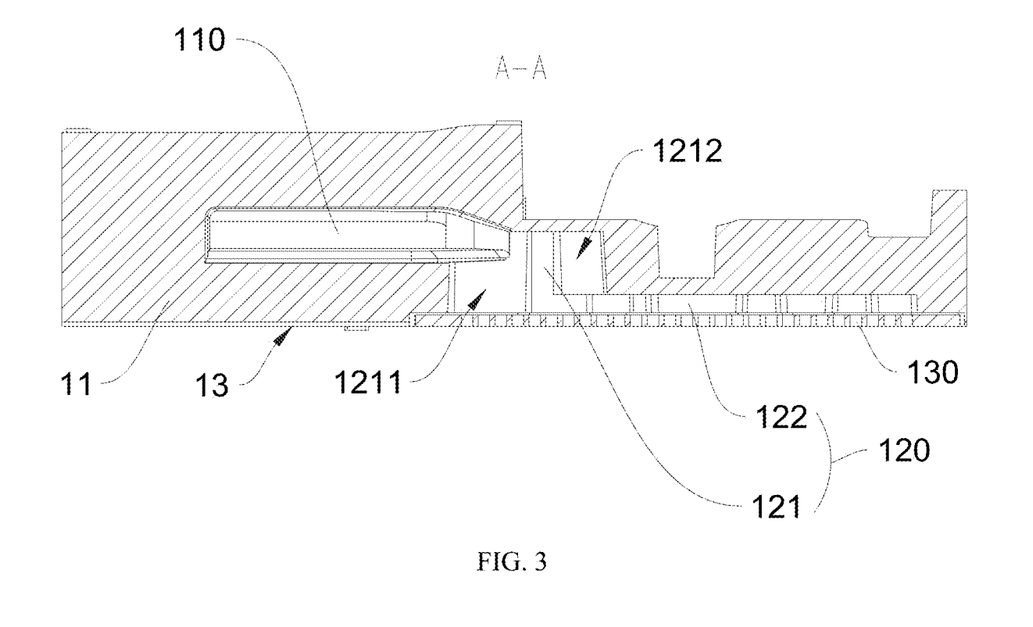
FIG. 3 illustrates a schematic cross-sectional diagram of a A-A direction in FIG. 2.
Figure 4:
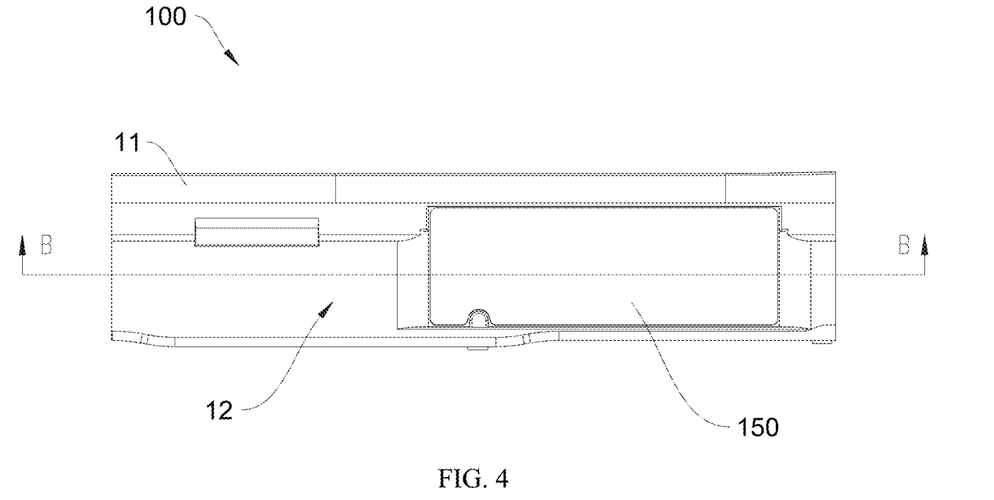
FIG. 4 illustrates a schematic structural diagram of the housing assembly in a third perspective according to the first embodiment of the disclosure.

Please refer to FIG. 3. In this embodiment, the second sound cavity 120 includes a first sub-sound cavity 121 and a second sub-sound cavity 122. The first sub-sound cavity 121 extends toward the outer surface 13, and the second sub-sound cavity 122 extends along the lengthwise direction of the side surface 12. The second sub-sound cavity 122 communicates with the first sound cavity 110 through the first sub-sound cavity 121, and the sub-sound cavity 122 directly communicates with the sound outlet 130.

Figure 6:
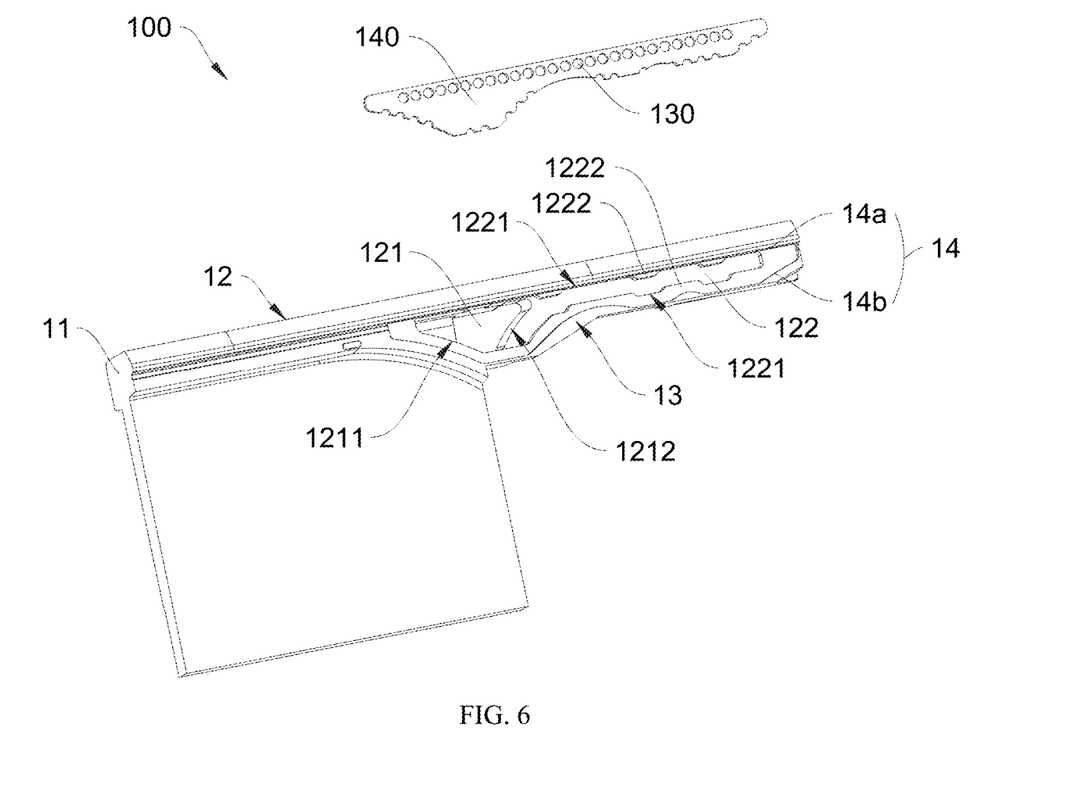
FIG. 6 illustrates an exploded schematic diagram of the housing assembly in a first perspective according to the first embodiment of the disclosure.

In this embodiment, the middle frame 11 further includes a first inclined surface 1211 and a second inclined surface 1212 (shown in FIG. 3 and FIG. 6). The first inclined surface 1211 and the second inclined surface 1212 are oppositely arranged along the lengthwise direction of the side surface 12 to form the first sub-sound cavity 121.

In this embodiment, a buffer space can be formed between the first inclined surface 1211 and the opposite second inclined surface 1212, so that sound waves transmitting to the first sub-sound cavity 121 through the first sound cavity 110 will not project perpendicularly to an inner wall of the first sub-sound cavity 121, thus avoiding power loss caused by the sound waves returned along the same way as coming to improve sound quality.

It can be understood that inclined angles of the first inclined surface 1211 and the second inclined surface 1212 relative to the middle frame 11 can be arbitrary angles. As a manner, the inclined angles of the first inclined surface 1211 and the second inclined surface 1212 may be determined according to a configuration of a sound outlet structure passing through the outer surface 13 to improve the appearance or sound quality.

In this embodiment, at least one of the first inclined surface 1211 and the second inclined surface 1212 is a curve surface. It could be understood that when the first inclined surface 1211 or the second inclined surface 1212 is a curve surface, the sound waves have a larger reflecting angle in a smaller incidence area, thus a probability of loss caused by the sound waves returned along the same way as coming is reduced. In other possible embodiments, the first inclined surface 1211 and the second inclined surface 1212 may be planes or at least one of them is concaves, or other shapes. As an embodiment, a shape of the outer surface 13 of the first inclined surface 1211 and the second inclined surface 1212 may be determined according to the shape of the sound outlet structures of the outer surface 13 to improve the appearance or sound quality.

Please refer to FIG. 6. In the present embodiment, the second sound cavity 120 is defined in the middle frame 11 and passes through the outer surface 13 of the middle frame 11 to form a recess 14. The acoustic channel communicates with an external environment through the recess 14. The housing assembly 100 includes a decorative member 140.

The decorative member 140 is disposed on the middle frame 11. The decorative member 140 is disposed on the supporting part 1222 and covers the other end of the acoustic channel. In some embodiments, the decorative member 140 is attached to the outer surface 13 and covers recess 14. As an embodiment, the sound outlet 130 is defined in the decorative member 140. It can be understood that in other possible embodiments, the sound outlet 130 may be disposed in the outer surface 13 or the side surface 12 of the middle frame 11.

In an embodiment the sound outlet 130 includes a number of sound outlets, and the sound outlets 130 are spaced arranged in the decorative member 140 along the lengthwise direction of the side surface 12. It can be understood that in other possible embodiments, the sound outlets 130 may be spaced arranged in the decorative member 140 along other direction, e.g., a direction perpendicular to the side surface 12. In another embodiment, the sound outlet 130 may be a single sound outlet and a shape of the sound outlet 130 may be various, such as a circle, a triangle, a rectangle, or a long strip.

Please refer to FIG. 6. In the present embodiment, a contour of the recess 14 includes a straight line 14a and a curved line 14b, that is the inner surface 1221 includes the straight line 14a and the curved line 14b. The straight line 14a is opposite and connected to the curved line 14b. An extending direction of the straight line 14a is parallel to the lengthwise direction of the side surface 12. The curved line 14b is away from the side surface 12 relative to the straight line 14a.

In an embodiment, the sound outlet 130 is disposed at a side of the decorative member 140 close to the straight line 14a. It can be understood that in other possible embodiments, the sound outlet 130 may be disposed at a side of the decorative member 140 close to the curved line 14b. When the sound outlet 130 is multiple, the sound outlets 130 are spaced arranged along a contour of the straight line 14a or the curved line 14b.

Please refer to FIG. 6. The middle frame 11 includes an inner surface 1221. The inner surface 1221 is located in the second sub-sound cavity 122 and surrounds the recess 14. The middle frame 11 further includes a supporting part 1222 disposed at the inner surface 1221. As a means, the supporting part 1222 is used to abut an inner wall of the decorative member 140 to make the decorative member 140 installed at the recess 14 more stable. It can be understood that it is preferred that the supporting part 1222 does not completely cover a corresponding position of the sound outlet 130 disposed in the decorative member 140, and the supporting part 1222 does not block a flow of sound waves inside the second cavity 120.

As a means in the present embodiment, the supporting part 122 includes a number of the supporting parts 1222, and the supporting parts 1222 are spaced arranged in the inner surface 1221 along the lengthwise direction of the side surface 12 to support the decorative member 140. It can be understood that in other possible embodiments, the middle frame 11 may be a single supporting part 1222. When the sound outlet 130 is opened in a side of the decorative member 140 close to the straight line 14a, the single supporting part 1222 may be only arranged in the inner surface 1221 (that is, a lower surface of the second sound cavity 120 close to the curved line 14b. When the sound outlet 130 is opened in a side of the decorative member 140 close to the curved line 14b, the supporting part 1222 is arranged in the inner surface 1221 (that is, an upper surface of the second sound cavity 120) of the middle frame 11 close to the straight line 14a.

Please refer to FIG. 5 and FIG. 7. In the present embodiment, the acoustic channel communicates with an outlet 15. The outlet 15 is defined on the middle frame 11 and is spaced with the other end of the acoustic channel. As a means, the first sound cavity 110 included by the acoustic channel is defined in the side surface 12 of the middle frame 11 to form the outlet 15 which communicates with an external environment. The housing assembly 100 further includes a sealing member 150. The sealing member 150 is disposed on the side surface 12 to seal the outlet 15. As a means, the sealing member 150 is attached to the side surface 12 of the middle frame 11 and covers the outlet 15.

In this embodiment, the first sound cavity 110 penetrates the side surface 12 of the middle frame 11 to form the outlet 15, so that difficulties of manufacturing an acoustic channel in the housing assembly 100 in actual production are reduced, requirements for production equipment and modules are reduced, production cost is reduced, and production efficiency is improved. In addition, by the sealing member 150 covering the outlet 15, sound waves from the first sound cavity 110 are kept from passing through the outlet 15 directly, as well as reducing production difficulties, and avoiding effecting the sound quality.

As a means, as shown in FIG. 5 and FIG. 7, a sealing installation groove 16 is further disposed on the side surface 12 of the middle frame 11. The outlet 15 corresponds to the sealing member installation groove 16. The sealing member 150 is disposed in the sealing member installation groove 16 and covers the outlet 15.

In this embodiment, by disposing sealing member installation groove 16, the sealing member 150 can be accommodated in the sealing member installation groove 16, thus appearance of the side surface 12 can be kept flat, appearance of products is more beautiful, possible wear caused by the sealing member 150 protruding from the side surface 12 is avoided as well, and stability of an entire structure is enhanced.

In this embodiment, as shown in FIG. 7, the first sound cavity 110 passes through a bottom surface 17 of the sealing installation groove 16 to from the outlet 15. An area of the bottom surface 17 (an area of the bottom surface 17 without forming the outlet 15) is larger than an area of the outlet 15. As a means, a size of the sealing member 150 is matched with the sealing installation groove 16. When the sealing member 150 is accommodated in the sealing installation groove 16, the sealing member 150 does not protrude from the side surface 12, thus entire appearance of the side surface 12 and the sealing member 150 is flat.

It can be understood that, in other possible embodiments, the side surface 12 of the middle frame 11 may be not grooved. The sealing member 150 may be attached to the side surface 12 of the middle frame 11 and covers the outlet 15, thus the sealing member 150 protrudes from the side surface 12. The sealing member 150 may be directly embedded and fixed in the outlet 15 and the sealing member 150 does not protrude from the side surface 12, which also achieve flat appearance and sealing the outlet 15 as well.

In this embodiment, a material of the sealing member 150 may be PET (polyethylene glycol terephthalate). The PET has an excellent physical and mechanical properties in a wide temperature range. Surfaces of the PET is smooth. Properties of sound insulation and electrical insulation of the PET are excellent. It can be understood that in other possible applications, materials of the sealing member 150 may be made of metal, plastic, resin, or other materials.

The housing assembly 100 provided by this embodiment form an acoustic channel with an offset configuration by communicating the first sound cavity 110 extending toward the side surface 12 of the middle frame 11, the second sound cavity 120 extending along the lengthwise direction of the side surface 12 with the sound outlet 130 opened in the outer surface 13. The receiver 160 communicates with the external environment through the acoustic channel with an offset configuration, so that under a premise of ensuring sound quality of an audio, space occupation close to the sound outlet 130 is saved and product appearance is enhanced to meet appearance requirements.

Second Embodiment

Figure 8:
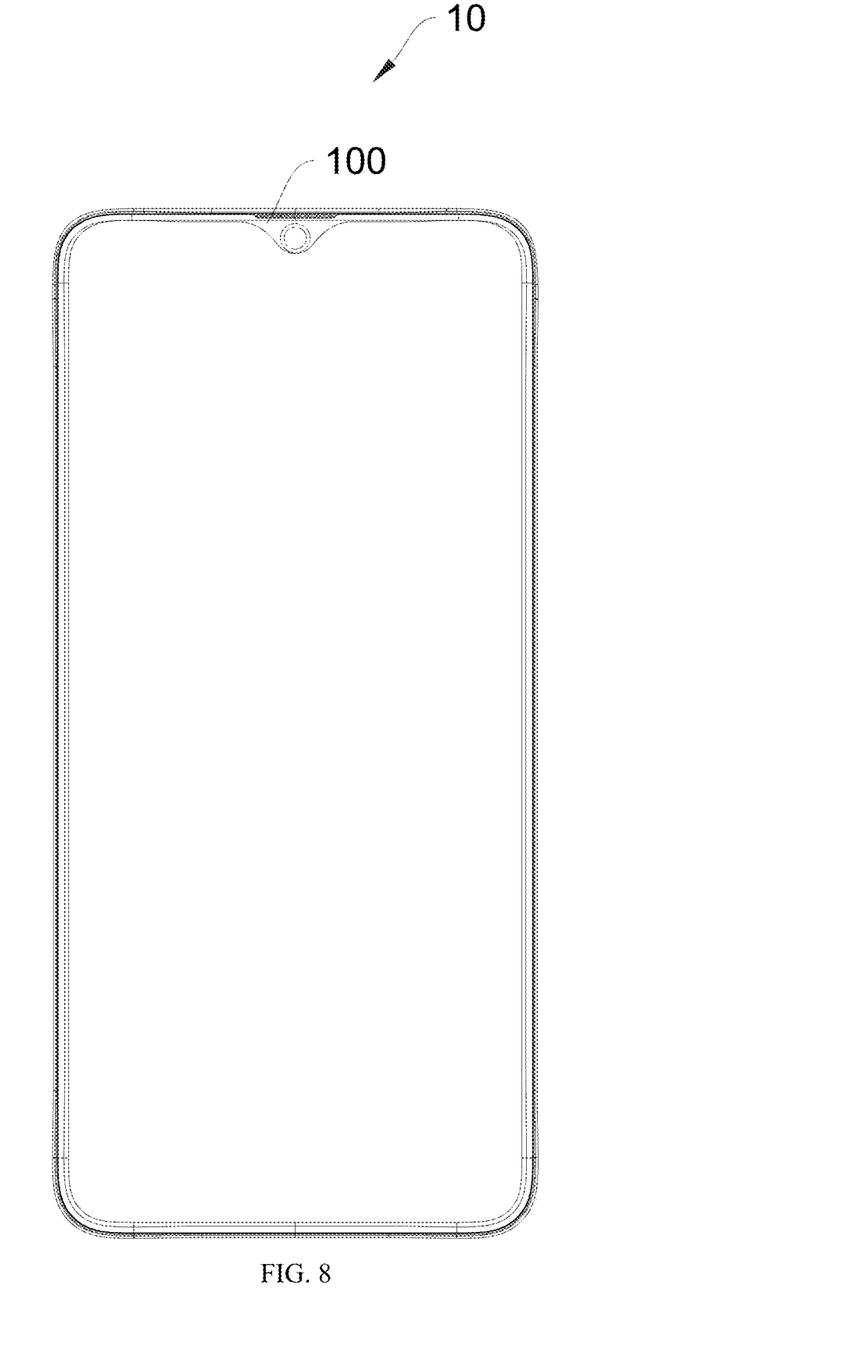
FIG. 8 illustrates a schematic structural diagram of an electronic device according to a second embodiment of the disclosure.

Please refer to FIG. 8. FIG. 8 is a schematic structural diagram of an electronic device 10 according to a second embodiment of the disclosure.

In this embodiment, the electronic device 10 includes a housing assembly 100 according to the first embodiment and a receiver 160 (as shown in FIG. 7). The receiver 160 is arranged in the housing assembly 100, and corresponds to one end of a first sound cavity 110 away from a second sound cavity 120. As a means, a receiver may be arranged in a first sound cavity 110 to improve space utilization.

In this embodiment, the housing assembly 100 may be further grouped with other structures (e.g., a display screen unit, a camera module, and a sensor module etc.) to jointly form the electronic device 10.

The electronic device 10 of the present embodiment includes an acoustic channel with an offset configuration inside the housing assembly 100 communicating the receiver 160 with an external environment, thus under a premise of ensuring sound quality of an audio, corresponding space utilization for the electronic device 10 close to a sound outlet 130 is saved, more other modules can be accommodated in an inner space close to the sound outlet 130, and foundation for enhancing product appearance is established.

Third Embodiment

Figure 9:
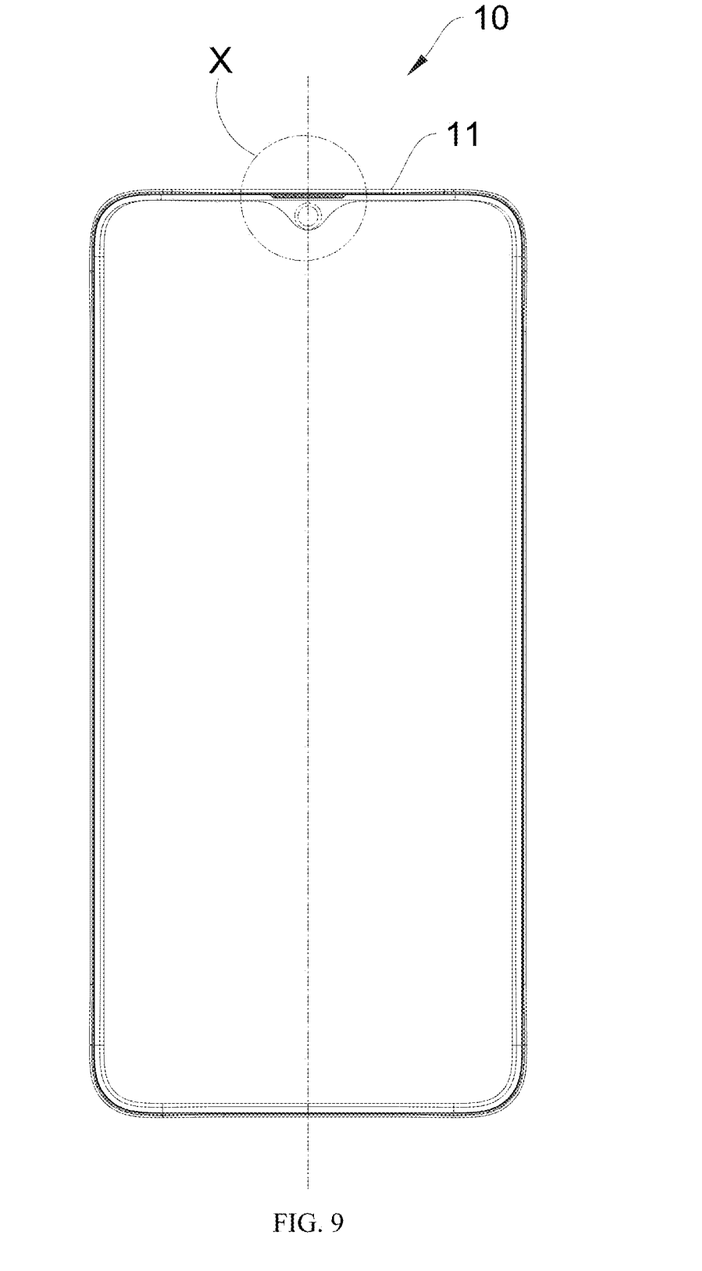
FIG. 9 illustrates a schematic structural diagram of an electronic device according to a third embodiment of the disclosure.

Please refer to FIG. 9. FIG. 9 is a schematic structural diagram of an electronic device 10 according to a third embodiment of the disclosure.

In this embodiment, the electronic device 10 includes a middle frame 11 according to a first embodiment and a receiver 160 (as shown in FIG. 7). The middle frame 11 includes a side surface 12. A first sound cavity 110, a second sound cavity 120 and a sound outlet 130 is located in the middle frame 11. The first sound cavity 110 communicates with the sound outlet 130 through the second cavity 120.

In this embodiment, the receiver 160 may be arranged in one end of the first sound cavity 110. Sound waves projected by the receiver 160 enter the first sound cavity 110, and the sound waves transmit toward the side surface 12, then enter the second cavity 120, and transmit along a lengthwise direction of the side surface 12. Finally, the sound waves transmit to an external environment through the sound outlet 130.

Figure 10:
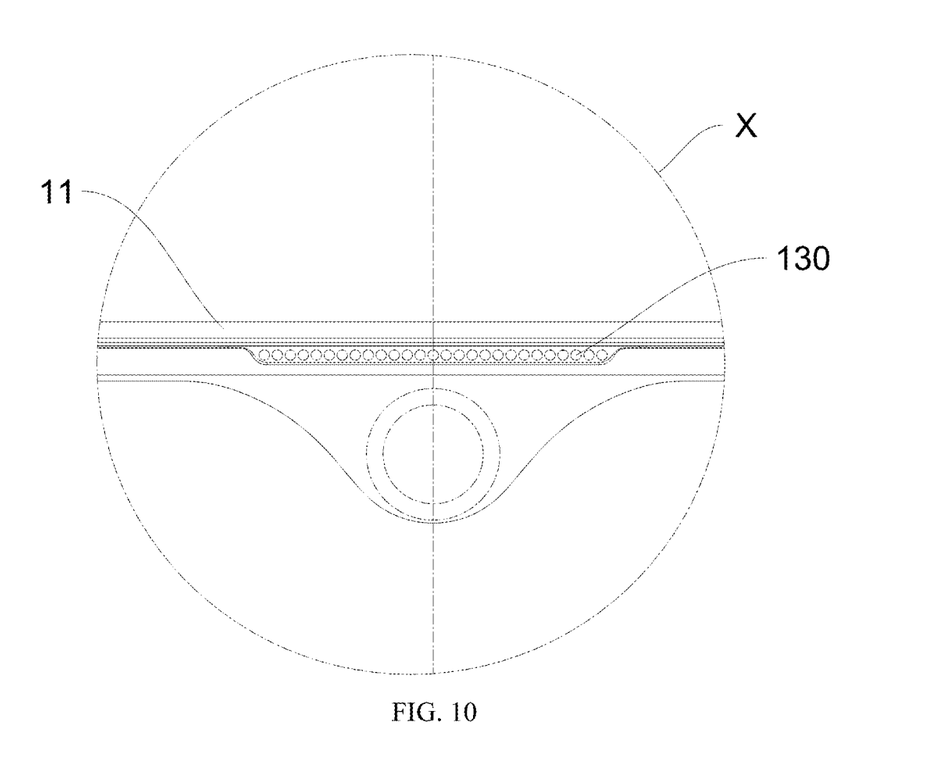
FIG. 10 illustrates an enlarged schematic diagram of an area X in FIG. 9.

In this embodiment, the sound outlet 130 includes a number of sound outlets. The sound outlets 130 are spaced arranged along the lengthwise direction of the side surface 12. As a means, as shown in FIGS. 9-10, a symmetric center line of these sound outlets 130 coincides with a symmetric center line of the middle frame 11. Sound waves entering the second sound cavity 120 through the first sound cavity 110 transmit along the lengthwise direction of the side surface 12 toward the symmetric center line of the middle frame 11.

The electronic device 10 of the present embodiment includes an acoustic channel with an offset configuration inside the housing assembly 100 communicating the receiver 160 with the external environment, thus under a premise of ensuring sound quality of audio, corresponding space for the electronic device 10 close to the sound outlet 130 in a top of the symmetric center line of the middle frame 11 is saved, more modules can be accommodated in an inner space close to a top of the symmetric center line of the electronic device 10, and foundation for enhancing appearance expressive force is established.

Figure 11:
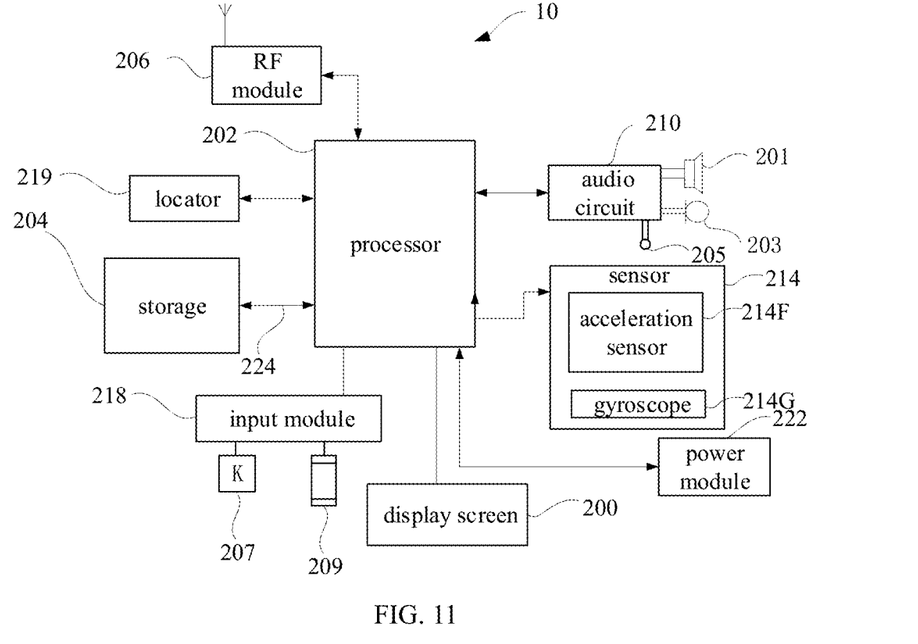
FIG. 11 illustrates a structural block diagram of an electronic device according to an embodiment of the disclosure.

Referring to FIG. 11, an electronic device 10 of the disclosure may include one or more processor 202 (only one processor is shown in FIG. 11), a memory 204, a RF (Radio Frequency) module 206, an audio circuit 210, a sensor 214, an input module 218, a power module 222. Those of ordinary skilled in the art can understand that a structure of the electronic device 10 shown in FIG. 11 is only for illustration and does not limit the structure. For example, the electronic device 10 may also include more or fewer components than those shown in FIG. 11, or have a different correspondence shown in FIG. 11.

Those of ordinary skilled in the art can understand that corresponding to the processor 202, all other components belong to peripherals. The processor 202 and the peripherals are coupled through multiple peripheral interfaces 224. The peripheral interfaces 224 may be performed based on the following standards: Universal Asynchronous Receiver/Transmitter (Universal Asynchronous Receiver/Transmitter, UART) 200, General Purpose Input Output (GPIO), Serial Peripheral Interface (Serial Peripheral) Interface, SPI, Inter-Integrated Circuit I2C, but not limited to the above standards. In some embodiments, the peripheral interfaces 224 may only include a bus. In other examples, the peripheral interfaces 224 may also include other elements, such as one or more controllers, e.g., a display controller for connecting to a display screen 200, or storage controller for connecting to a storage. In addition, the controllers can also be separated from the peripheral interfaces 224 and integrated into the processor 202 or corresponding peripherals.

The memory 204 may be used to store software programs and modules. The processor 202 runs software programs and modules stored in the memory 204 to execute various functional applications and data procession. The memory 204 may include a high-speed random access memory, and may also include a non-volatile memory, such as one or more magnetic storage devices, a flash memory, or other non-volatile solid-state memory. In some embodiments, the memory 204 may further include memories remotely provided corresponding to the processor 202. The memories may connect to the electronic device 10 or the display screen 200 via a network. Embodiments of the networks above include but are not limited to, the Internet, corporate intranets, local area networks, mobile communication networks, and combinations thereof.

The RF module 206 is used to receive and send electromagnetic waves and realize the mutual conversion between electromagnetic waves and electrical signals, so as to communicate with a communication network or other devices. The RF module 206 may include various existing circuit elements for performing these functions, such as antennas, radio frequency transceivers, digital signal processors, encryption/decryption chips, subscriber identity module (SIM) cards, memory, etc. The RF module 206 can communicate with various networks such as the Internet, an intranet, and a wireless network, or communicate with other devices through a wireless network. The wireless network mentioned above may include a cellular telephone network, a wireless local area network, or a metropolitan area network. The above-mentioned wireless network can use various communication standards, protocols and technologies, including but not limited to Global System for Mobile Communication (GSM), Enhanced Data GSM Environment (EDGE), broadband code Wideband code division multiple access (W-CDMA), code division multiple access (CDMA), time division multiple access (TDMA), wireless fidelity (Wi-Fi) (such as the American Institute of Electrical and Electronics Engineers standard IEEE802.10A, IEEE802.11b, IEEE802.11g and/or IEEE802.11n), Internet telephony (Voice over internet protocol, VOIP), Worldwide Interoperability for Microwave Access, Wi-Max), other protocols used for mail, instant messaging and short messages, and any other appropriate communication protocols, even those that have not yet been developed.

An audio circuit 210, an earpiece 201, a sound jack 203, and a microphone 205 together provide an audio interface between the user and the electronic device 10. In detail, the audio circuit 210 receives sound data from the processor 202, converts the sound data into electrical signals, and transmits the electrical signals to the earpiece 201. The earpiece 201 converts electrical signals into sound waves that can be heard by human ears. In particular, the earpiece 201 can be used as a receiver 160 (as shown in FIG. 7) described in the embodiment of the disclosure. The audio circuit 210 also receives electrical signals from the microphone 205, converts the electrical signals into sound data, and transmits the sound data to the processor 202 for further processing. Audio data can be obtained from the memory 204 or through the RF module 206. In addition, audio data may also be stored in the memory 204 or sent through the RF module 206.

The sensor 214 is disposed in the electronic device 10 or the display screen 200. The sensor 214 includes but is not limited to an acceleration sensor 214F, a gyroscope 214G, a magnetometer, and other sensors.

A gyroscope 214G can detect the posture of the electronic device 10, thereby determining the orientation of various components, determining the orientation of the display screen 200, determining the orientation of the screen, and so on. The acceleration sensor 214F can detect the magnitude of acceleration in various directions (generally three-axis). The acceleration sensor 214F can detect the magnitude and direction of gravity when it is stationary. The acceleration sensor 214F can be used to identify the application of the electronic device 10 posture (such as horizontal and vertical screen switching, related games, magnetic force Meter posture calibration), vibration recognition related functions (such as pedometer, percussion), etc. In addition, the electronic device 10 can also correspond to other sensors such as a gyroscope, a magnetometer, a barometer, a hygrometer, a thermometer, etc.

In this embodiment, the input module 218 may include the touch screen 209 disposed on the display screen 200. The touch screen 209 can collect the user's touch operations on or near it (for example, the user uses a finger, a stylus or any other suitable object or accessory to operate on the touch screen 209 or near the touch screen 209), so as to obtain the user's touch gestures, and drive the corresponding connection device according to the preset program. Optionally, the touch screen 209 may include a touch detection device and a touch controller. The touch detection device detects the user's touch position, detects the signal brought by the touch operation, and transmits the signal to the touch controller. The touch controller receives touch information from the touch detection device. The touch information is converted into contact coordinates, and then sent to the processor 202, The touch controller can receive and execute the command sent by the processor 202. In addition, the touch detection function of the touch screen 209 can be achieved by using multiple types such as resistive, capacitive, infrared, and surface acoustic waves. In addition to the touch screen 209, in other modified implementation applications, the input module 218 may also include other input devices, such as buttons 207. The buttons 207 may include character keys for inputting characters and control keys for triggering control functions. Applications of the control buttons include a "return to main screen" button, a power on/off button etc.

The display screen 200 is used to display information input by the user, information provided to the user, and various graphical user interfaces of the electronic device 10. The graphical user interfaces can be composed of graphics, text, icons, numbers, videos, and any combination thereof. In an application, the touch screen 209 can be arranged on the display screen 200 so as to form a whole with the display screen 200. Each display area of the display screen 200 can be provided with a touch screen.

The power module 222 is used to provide power to the processor 202 and other components. The power module 222 may include a power management system, one or more power sources (such as batteries or alternating current), a charging circuit, a power failure detection circuit, an inverter, a power status indicator, and any other electronic equipment 10 or display the components related to the generation, management, and distribution of power in the module.

The electronic device 10 further includes a locator 219. The locator 219 is used for determining the actual position of the electronic device 10. In this embodiment, the locator 219 uses a positioning service to achieve the positioning of the electronic device 10. The positioning service should be understood as a technology or service that obtains location information (such as latitude and longitude coordinates) of the electronic device 10 through a specific location technology and marks the location of the located object on an electronic map.

In summary, a housing assembly 100 and an electronic device 10 provided by the embodiments of the present disclosure form an acoustic channel with an offset configuration by communicating a first sound cavity 110 extending toward a middle frame 11, a second sound cavity 120 extending along a lengthwise direction with a sound outlet 130, so that under a premise of sound quality of audio, space occupation close to the sound outlet 130 is saved, product appearance is enhanced to meet appearance requirements.

In the description of this specification, descriptions with reference to the terms "one embodiment", "some embodiments", "examples", "specific examples", or "implementations" etc. mean specific features, structures, materials described in conjunction with the embodiment, application, or implementation, or mean that the feature is included in at least one embodiment, application, or implementation of the disclosure. In this specification, the schematic representations of the above-mentioned terms do not necessarily refer to the same embodiment or application. Moreover, the described specific features, structures, materials, or characteristics can be combined in any one or more embodiments or applications in a suitable way. In addition, those skilled in the art can combine the different embodiments or applications and the features of the different embodiments or applications described in this specification without contradicting each other.

Finally, it should be noted that the above embodiments are only used to illustrate the technical solutions of the disclosure, not to limit them. Although the disclosure has been described in detail with reference to the foregoing embodiments, those of ordinary skilled in the art should understand: the technical solutions recorded in the foregoing embodiments are modified, or some of the technical features thereof are equivalently replaced. The modifications or replacements do not drive the essence of the corresponding technical solutions to deviate from the spirit and scope of the technical solutions of the embodiments of the disclosure.

What is claimed is:

1. A housing assembly, comprising:
    a middle frame, wherein the middle frame comprises a side surface and a sound guiding inclined surface; and
    a first sound cavity, a second sound cavity and a sound outlet respectively defined in the middle frame, wherein one end of the first sound cavity corresponds to a receiver, and another end of the first sound cavity extends toward the side surface and is in communication with the second sound cavity, the second sound cavity extends along a lengthwise direction of the side surface and is in communication with the sound outlet, and the sound guiding inclined surface is located in the first sound cavity to redirect sound waves into the second sound cavity.

2. The housing assembly as claimed in claim 1, wherein a symmetric center line of the sound outlet coincides with a symmetric center line of the middle frame, and the first sound cavity deviates toward one side of the middle frame away from the symmetric center line relative to the symmetric center line.

3. The housing assembly as claimed in claim 1, wherein the middle frame comprises an outer surface connected to the side surface, the sound outlet is defined in the outer surface, the second sound cavity comprises a first sub-sound cavity and a second sub-sound cavity, the first sub-sound cavity extends toward the outer surface, the second sub-sound cavity extends along the lengthwise direction of the side surface, and the second sub-sound cavity is in communication with the first sound cavity through the first sub-sound cavity, the second sub-sound cavity directly communicated with the sound outlet.

4. The housing assembly as claimed in claim 3, wherein the middle frame comprises a first inclined surface and a second inclined surface, the first inclined surface and the second inclined surface are oppositely arranged along the lengthwise direction of the side surface to form the first sub-sound cavity.

5. The housing assembly as claimed in claim 4, wherein at least one of the first inclined surface and the second inclined surface is a curved surface.

6. The housing assembly as claimed in claim 1, wherein the second sound cavity is defined in the middle frame to form a recess, the housing assembly further comprises a decorative member, the decorative member is disposed on the middle frame to cover the recess, the sound outlet is defined in the decorative member.

7. The housing assembly as claimed in claim 6, the middle frame further comprises an inner surface surround the recess and a plurality of supporting parts spaced arranged along the inner surface, the supporting parts are configured to support the decorative member.

8. The housing assembly as claimed in claim 7, wherein the inner surface comprises a straight line and a curved line, and the straight line is opposite and connected to the curved line, an extending direction of the straight line is parallel to the lengthwise direction of the side surface, and the curved line is away from the side surface relative to the straight line.

9. The housing assembly as claimed in claim 1, wherein the first sound cavity is defined in the side surface to form an outlet communicating with an external environment, the housing assembly further comprises a sealing member, and the sealing member is disposed on the side surface and covers the outlet.

10. The housing assembly as claimed in claim 9, wherein a sealing member installation groove is defined in the side surface, the outlet corresponds to the sealing member installation groove, and the sealing member is accommodated in the sealing member installation groove and covers the outlet.

11. The housing assembly as claimed in claim 10, wherein the first sound cavity passes through a bottom surface of the sealing member installation groove to form the outlet, and an area of the bottom surface is larger than an area of the outlet.

12. The housing assembly as claimed in claim 10, wherein a material of the sealing member is PET.

13. A housing assembly, comprising:
    a middle frame, wherein an acoustic channel is defined in the middle frame, a first end of the acoustic channel faces a receiver, a second end of the acoustic channel communicates with an external environment, a plurality of inclined surfaces are disposed inside the acoustic channel to redirect sound waves, and the middle frame comprises a supporting part disposed at the second end of the acoustic channel;
    a decorative member, wherein the decorative member is disposed on the supporting part and covers another end of the acoustic channel; and
    a row of sound outlets, defined in the decorative member.

14. The housing assembly as claimed in claim 13, wherein the acoustic channel extends from one side of the middle frame to a center of the middle frame.

15. The housing assembly as claimed in claim 13, wherein there is an outlet communicated with the acoustic channel, the outlet is defined on the middle frame and is spaced with the second end of the acoustic channel, the housing assembly further comprises a sealing member for sealing the outlet.

16. An electronic device comprising:
    a housing assembly, comprising:
        a middle frame, wherein the middle frame comprises a side surface; and
        a first sound cavity, a second sound cavity and a sound outlet respectively defined in the middle frame, wherein one end of the first sound cavity corresponds to a receiver, and another end of the first sound cavity extends toward the side surface and is in communication with the second sound cavity, the second sound cavity extends along a lengthwise direction of the side surface and is in communication with the sound outlet, wherein a symmetric center line of the sound outlet coincides with a symmetric center line of the middle frame, and the first sound cavity deviates toward one side of the middle frame away from the symmetric center line relative to the symmetric center line; and
    a receiver, wherein the receiver is arranged in the housing assembly and corresponds to one end of the first sound cavity.

17. The electronic device as claimed in claim 16,
wherein sound waves entering the second sound cavity transmit along the lengthwise direction of the side surface toward the symmetric center line of the middle frame.

18. The electronic device as claimed in claim 16, wherein the second sound cavity is defined in the middle frame to form a recess;
wherein the housing assembly further comprises a decorative member, the decorative member is attached disposed to cover the recess, the sound outlet is defined in the decorative member; and
wherein the middle frame further comprises an inner surface surround the recess and a plurality of supporting parts spaced arranged along the inner surface to support the decorative member.

19. The housing assembly as claimed in claim 13, wherein the middle frame comprises a side surface, the acoustic channel comprises a first sound cavity and a second sound cavity, wherein the first sound cavity and the second sound cavity are defined in the middle frame, one end of the first sound cavity corresponds to the receiver, another end of the first sound cavity extends toward the side surface and is in communication with the second sound cavity, and the second sound cavity extends along a lengthwise direction of the side surface and is in communication with the sound outlets.

20. The housing assembly as claimed in claim 19, wherein a symmetric center line of the sound outlets coincides with a symmetric center line of the middle frame, and the first sound cavity deviates toward one side of the middle frame away from the symmetric center line relative to the symmetric center line.

\* \* \* \* \*